Figure 1:
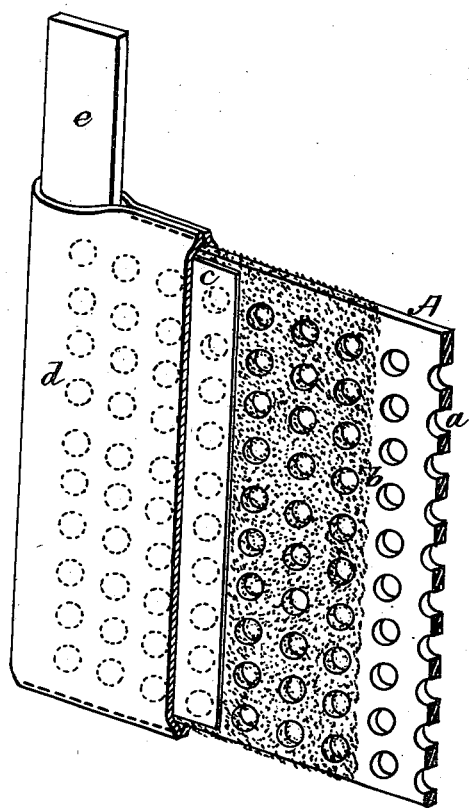

(No Model.)

C. A. FAURE.
GALVANIC POLARIZATION BATTERY.

No. 309,939. Patented Dec. 30, 1884.

Witnesses:
E. E. Masson
W. B. Masson

Inventor:
Camille Alphonse Faure
by A. Pollok
his attorney (No Model.)

C. A. FAURE.
GALVANIC POLARIZATION BATTERY.

No. 309,939. Patented Dec. 30, 1884.

Witnesses:
E. E. Masson
W. B. Masson

Inventor:
Camille Alphonse Faure
by A. Pollok
his attorney

UNITED STATES PATENT OFFICE.

CAMILLE A. FAURE, OF PARIS, FRANCE.

GALVANIC POLARIZATION-BATTERY.

SPECIFICATION forming part of Letters Patent No. 309,939, dated December 30, 1884.

Application filed August 10, 1882. (No model.) Patented in England April 13, 1882, No. 1,769.

*To all whom it may concern:*

Be it known that I, CAMILLE ALPHONSE FAURE, of Paris, in the Republic of France, have invented a new and useful Improvement in Galvanic Polarization-Batteries or Accumulators of Electricity, which improvement is fully set forth in the following specification.

This invention has reference more particularly to polarization or secondary batteries or accumulators of electricity of the form for which Letters Patent No. 252,002 were granted to my assignees January 3, 1882. It comprises the following improvements:

First. The supports of the electrodes are in the form of thin flat plates perforated or made full of holes, (square, oval, or of other suitable shape,) so that the said plates are lighter, and they are coated on both sides with the active material, which is applied thereto mechanically or in other suitable way before the electrode is immersed in the battery-fluid, and which fills the perforations or holes, but is applied mainly on the face of the plates.

Second. Leaves of parchment or other suitable material—such, for example, as parchmentized paper—are applied over the face of the electrodes to assist in retaining the active material in place during the formation of the battery. These parchment leaves may be used with advantage in connection with electrodes "formed" according to the Planté system, as with those formed in the manner described in the above-mentioned patent, and in connection with plain-surfaced plates as well as with those roughened, indented, corrugated, or serrated on the surface, to afford lodgment for the active material. These parchment leaves prevent the active material from working away from the plates or out of the perforations, holes, or cavities therein, while at the same time they allow access of the electrolytic liquid, and do not materially interfere with the action of the battery. Porous or open material—such as felt—is not so effective, since the active material (ordinarily lead or an oxide or salt of lead) is liable to work into and fill the pores. The parchment is gradually eaten up, so that by the time the active material becomes permanently set or hardened it has been destroyed.

Third. An open-work perforate or porous medium, as described in the aforesaid patent, is used outside of the parchment for holding the latter, as well as the active material, in place. The porous medium is preferably a sheet of felt, which is sewed around or stitched through the electrode, so as to form a sort of bag or porous inclosing-case.

Fourth. The conducting-supports to which the active material is applied are in the positive electrodes made thicker than the negative. From double to six times the thickness gives good results. By positive electrode is to be understood the electrode which is connected with the positive pole of the electric machine or other generator of electricity used for charging, and from which the current proceeds in discharging. From practical experiments it is found that the accumulative effect is greater for cells of the same weight, and the duration of the cell is longer with the above arrangement than with electrodes of equal thickness.

Fifth. In each cell there are four or more electrodes in the form of perforated plates coated or combined with active material, and these plates are so arranged that a positive electrode is between two negative electrodes and a negative between two positive electrodes, the electrodes of like name being connected with each other. Heretofore Planté has arranged in this way imperforate plates formed in his well-known manner. Heretofore, also, perforated metal has been used in secondary batteries to receive a lead deposit thereon; but, so far as I am aware, no one has ever arranged electrodes of the character stated in the manner specified. When so arranged an important advantage is obtained, in that substantially the whole of a large body of the active material on the several intermediate plates is influenced directly by each of the two adjacent plates or opposing electrodes.

Sixth. A special system comprising conducting cross-bars, in combination with connecting-conductors, has been devised for suspending heavy electrodes in a vat or containing-vessel.

Seventh. The containing vessels or cells are formed of cement lined with impervious material not attacked or corroded by the battery-fluid. For this lining glazed bricks set in sulphur, or in a mixture of pitch or other like material, are preferably employed. These tanks are particularly designed for large permanent storage-batteries.

Having indicated the general nature of the invention, the manner in which the same is or may be carried into effect will next be described with the aid of the accompanying drawings, which form a part of this specification, and which represent a polarization or storage battery or electric accumulator constructed in accordance with the invention.

Figure 2:
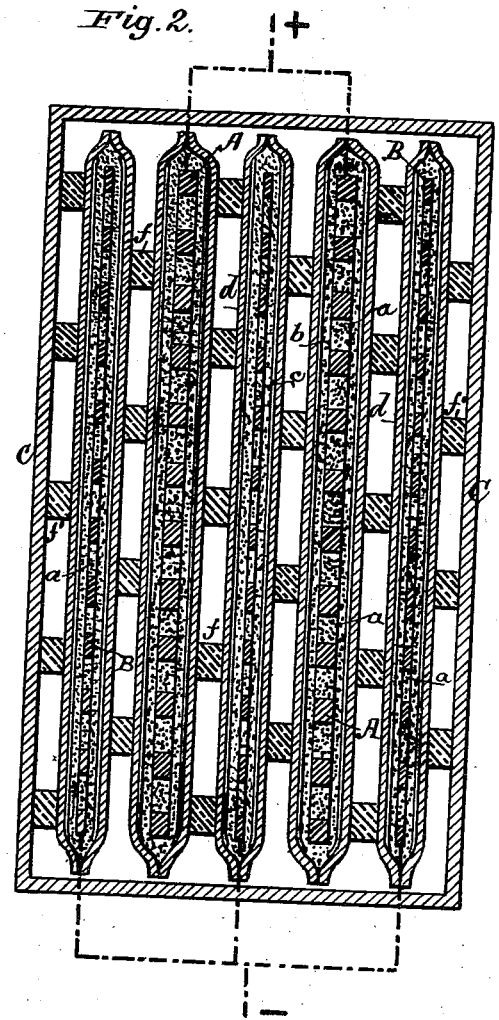
Figure 3:
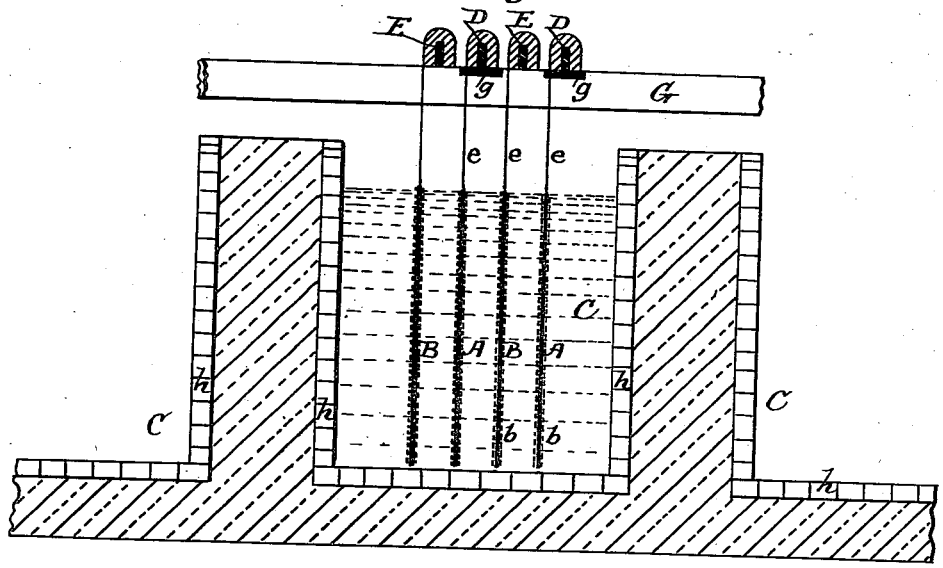

Figure 1 is a perspective view, partly in section, showing one of the improved plates or electrodes; Fig. 2, a horizontal section showing the arrangement of the electrodes in a cell; Fig. 3, a vertical section showing the means of suspending the plates and the construction of the cement tanks, and Fig. 4 a vertical section (at right angles to Fig. 3) illustrative of the means for suspending the electrodes or battery-plates.

Figure 4:
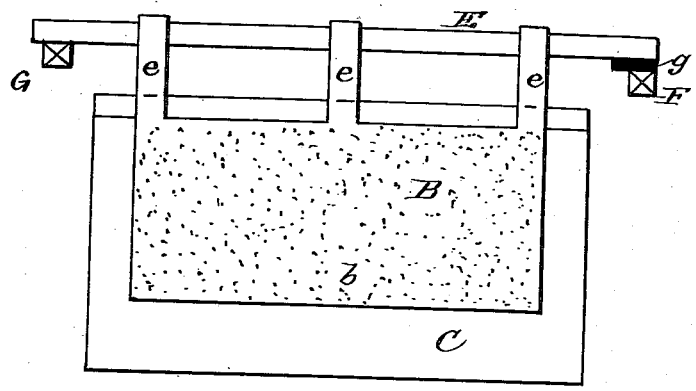

A B are plates of suitable conducting material, preferably of lead, A, Figs. 2, 3, and 4, being the positive plates, and B the negative. These plates are perforated with numerous small holes $a$, which are shown round, but which may be square, triangular, polygonal, semicircular, or of other desired shape, regular or irregular. The holes may be punched by hand or by machinery, or they may be cast in the plates. The active material $b$ is applied to these plates in any suitable way. For example, minium or red lead made into paste with water or other suitable liquid may be applied with a trowel.

The plates employed are thin plates, and the amount of active material used is such that it lies half or more than half upon the surface of the plate. Of course the plates for large batteries are or may be made thicker, as well as of greater surface dimensions, than for smaller ones. The terms thin plates, with the active material mainly on the surface, are used in contradistinction to thick plates, having the active material mainly or entirely within the holes or perforations in said plates. The active material is applied to both faces of the plates. Outside the active material on both sides is a sheet, $c$, of parchment or equivalent material, such as parchment paper. The perforated plates, with the active material thereon, and the parchment sheets are inclosed in a bag of felt, $d$, which is stitched around the edges. Stitches may also be made through the plates. On each plate there are one or more tags or ears, $e$, integral or in one piece with the plate. These tags or ears may be left in cutting the plates, if rolled metal is used, or may be cast with the body of the plate when the plates are formed by casting. The positive plates A are made thicker than the negative plates B, being, as shown, of about double the thickness. A number of these positive and negative plates (even or odd) are placed in a containing vessel or cell, C, alternately a positive and a negative, and the plates of like name are connected by a conductor attached to the ears or tags $e$.

In order to keep the plates apart a strip, $f$, of rubber, gutta-percha, or similar insulating material, is wrapped around one plate—say the positive plate—of each pair and fastened thereto. Strips $f'$ may be used to keep the end plates from contact with the walls of the cell or containing-vessel.

The plates or electrodes are suspended in the containing vessel or cell C by a series of conducting cross-bars, D E, (formed, preferably, of iron covered with lead,) the ends of which rest upon longitudinal conducting-bars F G. (Preferably of copper.)

The plates or electrodes A B are suspended from the cross-bars D E by the tags or ears $e$, of which each plate is shown as having three, and each plate is thus connected electrically with one of said cross-bars, each positive plate or electrode with a bar, D, and each negative one with a bar, E. The bars D have one end in direct metallic contact with the longitudinal bar F, the other end, which rests on the bar G, being insulated therefrom by a block, $g$. In like manner the cross-bars E are in metallic contact with the bar G, but are insulated from the bar F. The positive and negative electrodes or plates are thus connected in multiple arc, the bar F constituting the positive pole of the cell and the bar G the negative. The bars F G can be extended, if desired, so as to connect the plates or electrodes of several, two or more, cells.

The containing vessels or cells C (shown in Fig. 3) are permanent structures with walls of cement, beton, or other artificial stone, or of masonry or other suitable material, and a lining of glazed brick, $h$, set in molten sulphur or in a compound of pitch, or in other suitable filling or cementing material not liable to be attacked or corroded by the battery-fluid, which ordinarily would be a dilute solution of sulphuric acid in water.

The battery having been set up, is charged from a dynamo-electrical machine or other generator of electricity in the manner well known.

It is obvious that modifications may be made in the details without departing from the spirit of the invention, and that portions of the invention may be used separately—for example, the parchment sheets and felt bags—and other improvements as well can be used with other than perforated plates—for example, with plain plates, with grooved or corrugated plates, with plates roughened or provided with holes that do not extend through the plate, and so on.

The tanks, instead of being lined with glazed brick, may be lined with other non-corrodible material—for example, with wood soaked in and joined together with the compositions described in my application of even date herewith for improvement in containing vessels or cells for galvanic batteries, on which application Letters Patent No. 266,798 were granted October, 31, 1882.

It may be here observed that since filing this application the invention has been in part patented in Great Britain by Letters Patent No. 1,769 of 1882. This patent, dated April 13, and completed by lodging the final specification October 10, 1882, describes the arrangement for suspending the electrodes and giving contact with the conductors, and also the construction of the tank or vessel for holding the exciting-liquid, substantially as herein set forth, but does not describe the particular construction of the electrodes themselves.

Having now fully described my said invention and the manner of carrying the same into effect, what I claim is—

1. An electrode for polarization-batteries or electric accumulators, comprising a thin flat perforated plate mechanically or primarily coated on both sides with active material, the said material filling the perforations, but being applied mainly on the face of the plates, substantially as described.

2. An electrode comprising a suitable plate or support and active material thereon, and having a sheet of parchment or its specified equivalent placed over the active material, substantially as described.

3. The combination of the conducting plate or support, the active material, the parchment sheet or its equivalent and the felt or porous retaining medium outside the parchment sheet, substantially as described.

4. An electrode comprising a conducting plate or support, active material on both sides of said plate or support, a parchment sheet or its equivalent outside the active material, and a felt bag or inclosing-case of porous material, substantially as described.

5. A polarization-battery or accumulator having the plates or supports of the positive electrodes or electrode of greater thickness than those of the negative electrodes or electrode, said plates or supports of metal—such as lead—and being coated or combined with active material of the nature of lead oxide or finely-divided lead, substantially as described.

6. In a cell of secondary battery, a series of four or more electrodes comprising perforated plates primarily combined with a permanent coating of active material packed in the perforations, said plates being arranged in alternation and connected, as described, so that a positive is between two negative electrodes, and a negative between two positive, and the same active material on each intermediate plate is influenced by several plates on both sides of the same, as set forth.

7. The combination of the conducting cross-bars, the electrodes suspended from and electrically connected with said cross-bars, and the conductors or longitudinal bars insulated from each other and connected each with a portion of the cross-bar, substantially as described.

8. A storage-battery or accumulator having a containing vessel or cell with cement or masonry walls lined with glazed brick or other suitable material not liable to be attacked or corroded by the battery-fluid, substantially as described.

9. A storage-battery or electric accumulator comprising a series of electrodes suspended within a containing-vessel having walls of cement or masonry lined with glazed bricks or other protecting material, substantially as described.

10. A storage-battery or electric accumulator comprising one or more permanent containing vessels or cells, and a series of electrodes suspended from cross-bars in each vessel or cell, and connected by longitudinal bars on which said cross-bars rest, said electrodes and cross-bars being connected alternately with the two longitudinal bars, so that the positive electrodes are interposed between two negative electrodes, and vice versa, substantially as described.

In testimony whereof I have signed this specification in the presence of two subscribing witnesses.

C. A. FAURE.

Witnesses:
 A. POLLOK,
 ROBT. M. HOOPER.